United States Patent Office

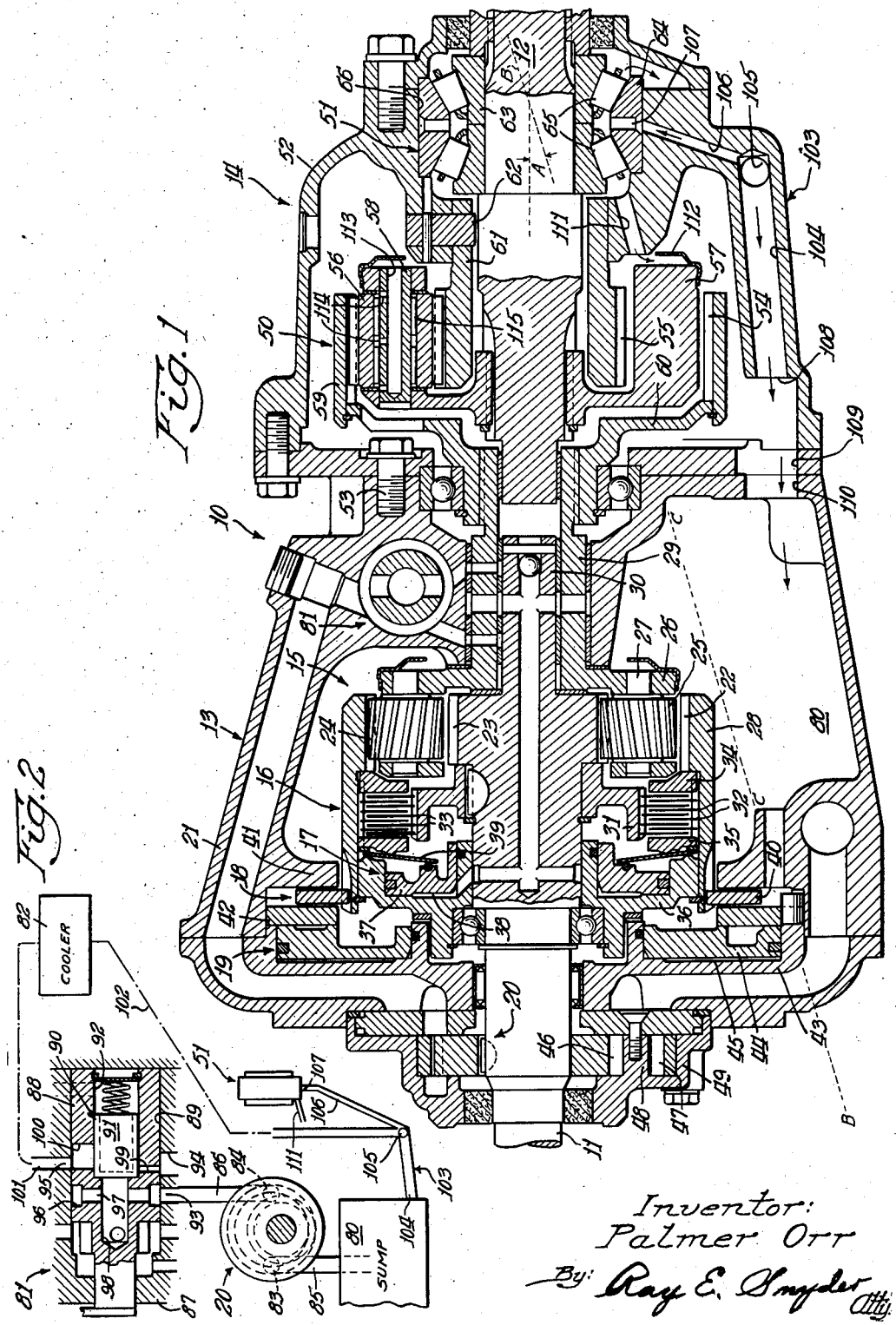

2,968,190
Patented Jan. 17, 1961

2,968,190

TRANSMISSION MECHANISM

Palmer Orr, Muncie, Ind., assignor to Borg-Warner Corporation, Chicago, Ill., a corporation of Illinois Filed Feb. 17, 1958, Ser. No. 715,723

8 Claims. (Cl. 74—467)

This invention relates to transmission mechanism, including improved lubrication means therefor.

This invention constitutes an improvement to the transmission mechanism illustrated in the related pending application of D. W. Kelbel, Serial No. 641,125, filed February 19, 1957 and now Patent No. 2,877,668.

It is an object of the present invention to provide an improved transmission mechanism having an input shaft and an output shaft, a duplex planetary gear set, a brake operable on said gear set to effect a reverse drive condition between said shafts, and a clutch disposed within said brake and operable on said gear set to establish a forward drive condition between said shafts.

It is another object of the present invention to provide an improved transmission mechanism having an input shaft and an output shaft, a first duplex planetary gear set driven by said input shaft, a second planetary gear set driven by said first gear set and operable to drive said output shaft, a friction brake operable to hold an element of said first gear set for establishing a reverse drive condition between said input shaft and said output shaft, and a friction clutch disposed within said friction brake and operable on said first gear set to establish a forward drive condition between said input shaft and said output shaft, said second gear set being effective to establish a fixed reduction gear ratio between said first gear set and said output shaft.

It is an additional object to provide an improved transmission mechanism having an input shaft and an output shaft, bearing means for supporting said output shaft, fluid pressure means for circulating fluid through the transmission and including a fluid ejector for controlling the fluid level in a portion of the transmission housing, and means for utilizing the fluid back pressure head in said ejector for lubricating said bearing.

It is still another object to provide a transmission mechanism in accordance with the preceding objects having means including said ejector for lubricating said bearing and additionally for lubricating said second planetary gear set.

The invention consists of the novel constructions, arrangements and devices to be hereinafter described and claimed for carrying out the above stated objects and such other objects as will appear from the following description of a preferred form of the invention, illustrated with reference to the accompanying drawings, wherein:

Fig. 1 is a longitudinal sectional view of the transmission mechanism of the present invention; and Fig. 2 is a diagrammatic illustration of a portion of the hydraulic controls for the transmission.

Referring now to Fig. 1, a transmission mechanism 10 is shown which includes a drive shaft 11, a driven shaft 12, a forward transmission unit 13, and a rear transmission unit 14. The drive shaft 11 is connected to a driving engine through any suitable means (not shown), and the driven shaft 12 is connected to a propeller shaft through any suitable means (not shown).

The forward transmission unit 13 in general comprises a duplex planetary gear set 15, a multiple plate direct drive clutch 16, a hydraulic servomotor 17 for engaging the clutch 16, a reverse drive brake 18, a hydraulic servomotor 19 for engaging the brake 18, and a fluid pump 20, all enclosed within a transmission housing 21.

The duplex planetary gear set 15 comprises a ring gear 22, a sun gear 23 formed on an enlarged portion of the drive shaft 11, a plurality of planet gears 24 and 25, and a planet gear carrier 26. The planet gears 24 and 25 are in mesh with each other and are journaled on hollow studs 27 mounted in the carrier 26. The planet gears 24 also are in mesh with the ring gear 22, and the planet gears 25 are in mesh with the sun gear 23. The ring gear 22 is formed in the interior of a drum 28, and the planet gear carrier 26 is formed integrally with a sleeve shaft 29 journaled within the housing 21. An extended end portion 30 of the drive shaft 11 is piloted within the sleeve shaft 29.

The direct drive clutch 16 comprises the outer drum 28, an inner drum 31 keyed to the drive shaft 11, a plurality of friction discs 32 splined within the outer drum 28, and a plurality of friction discs 33 splined to the inner drum 31 and interleaved with the discs 32. The friction discs 32 and 33 are sandwiched between a fixed end pressure plate 34 splined within the drum 28 and a movable end pressure plate 35 slidably disposed within the drum 28.

The hydraulic servo motor 17 comprises an annular casing 36 journaled on the drive shaft 11 and supporting the drum 28 and an annular piston 37 slidably disposed within an annular cavity 38 formed in the casing 36. A Belleville-type washer 39 is interposed between the piston 37 and the movable end pressure plate 35 of the clutch 16. The washer 39 is pivotally disposed with its outer periphery against the annular casing 36 and its inner periphery in contact with the piston 37. The washer 39 also is in contact with the movable pressure plate 35 of the clutch 16 at a point near its outer periphery so that the body of the washer 39 functions as a lever in engaging the clutch 16.

The reverse drive brake 18 comprises a friction disc 40 splined on the exterior of the drum 28, an annular casing portion 41 formed within the housing 21 and constituting a fixed end pressure plate for the brake 18, and an axially movable pressure plate 42 for pressing the friction disc 40 into engagement with the fixed plate 41.

The servomotor 19 for engaging the reverse drive brake 18 comprises an annular casing portion 43 formed in the housing 21 and an annular piston 44 slidably disposed within an annular cavity 45 formed in the casing portion 43. The piston 44 abuts directly against the movable pressure plate 43 of the brake 18.

The fluid pump 20 comprises an inner gear 46 keyed to the drive shaft 11, an outer gear 47 in mesh with and eccentrically disposed with respect to the gear 46, and a lunar shaped member 48 fixedly disposed between the eccentric gears 46 and 47. The gears 46 and 47 are rotatably disposed within a casing portion 49 of the housing 21.

The rear transmission unit 14 in general comprises a planetary gear set 50, a bearing block 51 for supporting the driven shaft 12, and a housing 52. The housing 52 is anchored to the housing 21 by means of a plurality of machine screws 53.

The planetary gear set 50 comprises a ring gear 54, a sun gear 55, a plurality of planet gears 56, and a planet gear carrier 57. The planet gears 56 are in mesh with the ring gear 54 and with the sun gear 55 and are journaled on hollow studs 58 mounted in the planet gear carrier 57. The ring gear 54 is formed on the interior of a drum 59 which is attached to and supported by an annular member 60. The annular member 60 is splined to and driven by the sleeve shaft 29 of the front transmission unit 13. The sun gear 55 is formed on the exterior of a hub 61 which is anchored to the housing 52 by means of a dowel pin 62. The planet gear carrier 57 is splined to the output shaft 12.

The bearing block 51 comprises two adjacent sets of roller bearings each having an inner race 63, an outer race 64, and a plurality of tapered rollers 65 disposed between the races 63 and 64. The inner races 63 are journaled on the output shaft 12 and the outer races 64 are pressed within an annular cavity 66 formed in the housing 52.

The transmission mechanism 10 may have a neutral condition, a forward drive condition, and a reverse drive condition.

Neutral condition is obtained when both the clutch 16 and the brake 18 are disengaged. In this condition, driving torque from the engine drives the drive shaft 11 and the sun gear 23 of the gear set 15. There is no reaction member for the gear set 15 in this condition and the forward rotation of the sun gear 23 causes the planet gears 24 and 25 to rotate about the studs 27 and drive the ring gear 22 freely in the forward direction. There is thus no driving torque supplied to the rear transmission unit 14 or to the driven shaft 12.

Forward drive condition is obtained when the clutch 16 is engaged and the brake 18 is disengaged. The clutch 16 is engaged by supplying fluid under pressure to the servomotor 17 which causes the piston 37 to move axially to the right, as shown in Fig. 1, and press the friction discs 32 and 33 into engagement. Engagement of the clutch 16 locks together the ring gear 22 and the sun gear 23 so that the gear set 15 thereafter is caused to rotate as a unit and drives the planet gear carrier 26 and the sleeve shaft 29 at a one-to-one speed ratio with respect to the drive shaft 11. The sleeve shaft 29 drives the annular member 60 and the ring gear 54 of the gear unit 50 in the forward direction and at the same speed as the drive shaft 11. The sun gear 55 serves as a permanently fixed reaction member for the gear set 50 and the planet gears 56 are driven by the ring gear 54 and drive the planet gear carrier 57 at a reduced speed gear ratio with respect to ring gear 54.

Reverse drive condition is obtained when the brake 18 is engaged and the clutch 16 is disengaged. The brake 18 is engaged by supplying fluid under pressure to the servomotor 19 so as to cause the piston 44 to move to the right as shown in Fig. 1. The piston 44 acts against the pressure plate 42 which, in turn, presses the friction disc 40 into engagement with the stationary pressure plate 41. The engaged brake 18 functions to hold stationary the drum 28 and the ring gear 22 of the gear set 15. In this condition, the forwardly rotating drive shaft 11 and sun gear 23 drive the planet gears 25 in the reverse direction about the studs 27. The reversely rotating planet gears 25 drive the planet gears 24 forwardly about the studs 27. The stationary ring gear 22 in mesh with the planet gears 24 serves as a fixed reaction element and as the planet gears 24 rotate forwardly about the studs 27 they walk around the interior of the ring gear 22 carrying the planet gear carrier 26 in retrograde motion with respect to the drive shaft 11. The reversely rotating planet gear carrier 26 and integral sleeve shaft 29 drives the driven shaft 12 in the reverse direction through the planetary gear set 50 at a fixed gear reduction ratio, as previously described for forward drive condition.

It is contemplated that the forward transmission unit 13 can be utilized independently of the rear transmission unit 14. For such application, the sleeve shaft 29 can be splined or otherwise attached to the driven shaft 12. The operation of the forward transmission unit 13 would be identical to that heretofore described, with the exception of the reduced gear ratio provided by the planetary gear set 50.

Fluid pressure for operating the hydraulic servomotors 17 and 19 is obtained from the pump 20 and is supplied to the servomotors 17 and 19 through a suitable valving and conduit means, such as that shown in the pending application of D. W. Kelbel, Serial No. 641,125, filed February 19, 1957. The fluid supplied by the pump 20 is also used for lubrication of the various rotating parts of the transmission 10, as will now be described.

The portion of the hydraulic control system for supplying lubricating fluid to the rotating parts of the transmission 10 in general comprises a fluid sump or reservoir 80 provided within the bottom of the housing 21, the pump 20, a rotary selector valve 81, and a fluid cooler 82. The pump 20 has an inlet port 83 and an outlet port 84. The inlet port 83 is in communication with the sump 80 through a fluid conduit 85, and the outlet port 84 opens into a fluid conduit 86 which leads to the valve 81.

The valve 81 comprises a casing portion 87 and a rotatable core 88 disposed within a cylindrical cavity 89 formed in the casing portion 87. A pressure regulating valve 90 comprising a spring loaded piston 91 is slidably disposed within a cylindrical cavity 92 formed within the valve core 88. The casing portion 87 is formed with an inlet port 93, and outlet ports 94 and 95. The valve core 88 is formed with an annular groove 96, a radially extending passage 97 in communication with the groove 96, and an axially extending central passage 98 in communication with a radial passage 97. The annular groove 96 is in communication with the fluid conduit 86 through the fluid inlet port 93, and the central passage 98 is adapted to be closed at one end by the spring loaded piston 91. The valve core 88 also is formed with radially extending ports 99 and 100 which open into the cylindrical cavity 92. The port 99 is aligned with the outlet port 94, and the port 100 is aligned with the outlet port 95.

The fluid cooler 82 is connected to the outlet port 95 of the valve 81 by means of a fluid conduit 101. The fluid cooler 82 is adapted to return fluid to the sump 80 through a conduit 102 and a fluid ejector 103 which opens into the sump 80.

The fluid ejector 103 comprises a longitudinally extending passage 104 bored in a portion of the housing 52. The conduit 102 leading from the fluid cooler 82 is attached to a port 105 in the housing 52 which opens into the passage 104. A channel 106 formed in the housing 52 also opens into the passage 104 and extends upwardly to a port 107 in the bearing block 51. The fluid discharge end 108 of the ejector 103 is in close proximity to registering openings 109 and 110 formed through the housings 52 and 21, respectively.

In operation, fluid is drawn by the pump 20 from the sump 80 through the conduit 85 and the inlet port 83 and is discharged under pressure through the outlet port 84 into the conduit 86. Fluid is allowed to pass through the port 93, the annular groove 96, and the radial passage 97 into the axial central passage 98. The fluid pressure supplied by the pump 20 acts against the piston 91 tending to cause it to move to the right, as shown in Fig. 2, and open the ports 99 and 100. Fluid passing through the port 99 is utilized for lubricating the front planetary gear set 15 in any suitable manner, such as is described in the pending application of D. W. Kelbel, Serial No. 641,125. Fluid passing through the port 100 and the port 95 is transmitted through the conduit 101 into the fluid cooler 82. The fluid cooler 82 may be of any suitable type and is utilized to reduce the temperature of the fluid circulated through the transmission 10. Such a cooler is desirable in the present embodiment, inasmuch as no water jacket or other cooling means has been provided for the transmission mechanism 10.

Fluid leaving the cooler 82 passes through the conduit 102 into the fluid ejector 103. The fluid passes through the central passage 104 and the ejector 103 functions as a nozzle to force the discharged fluid through the openings 109 and 110 into the sump 80. The fluid forcibly discharged from the ejector 103 passes through the openings 109 and 110 and draws the fluid from the rear housing 52 into the forward housing 21 by aspirator action.

This ejector action is especially important in particular applications where the rear transmission unit 14 is at a lower elevation than the forward unit 13. For example, the shafts 11 and 12 could be disposed at an angle A with respect to a horizontal plane B—B and the fluid level in the forward and rear housings 21 and 52 could be shown approximately by the line C—C. As is apparent, the ejector action for such application is important to keep the rear housing 52 from filling with fluid and from overheating as a consequence.

Lubrication of the bearing block 51 is provided by means of a portion of the fluid supplied through conduit 102 to the fluid ejector 103. The back pressure of the fluid flowing through the passage 104 causes the fluid to rise through the channel 106 and the port 107 into the interior of the bearing block 51. The fluid passes through the rollers 65 both forwardly and rearwardly. The fluid passing rearwardly is returned to the sump 80 through a conduit (not shown). Fluid passing forwardly through the rollers 65 is utilized for lubricating the planetary gear set 50.

A channel 111 is formed in the housing 52 which opens into the cavity 66 and allows the passage of fluid from the rollers 65 into a shroud or collector ring 112 mounted on the planet gear carrier 57. The fluid collected within the shroud 112 passes through longitudinal passages 113 formed in the studs 58 and through radially extending ports 114 for lubricating needle bearings 115 disposed between the planet gears 56 and the studs 58.

The lubrication system herein described advantageously provides a fluid ejector which functions to maintain a suitable fluid level within the rear housing of the transmission. The back pressure of the fluid ejector is utilized for lubricating the rear bearing block, and a portion of this fluid is also utilized for lubricating the rear planetary gear set.

I wish it to be understood that my invention is not to be limited to the specific constructions and arrangements shown and described except only insofar as the appended claims may be so limited, as it will be apparent to those skilled in the art that changes may be made without departing from the principles of the invention.

I claim:

1. In a transmission mechanism, the combination of a forward transmission housing, a rear transmission housing, a partition formed with an aperture separating said housings, a source of fluid pressure, and fluid circulating means including a fluid ejector in one of said housings supplied from said source for directing fluid directly through the aperture for controlling the fluid level in the other of said housings.

2. In a transmission mechanism, the combination of a forward transmission housing, a rear transmission housing, a partition formed with an aperture separating said housings, a driven shaft, bearing means for rotatably mounting said driven shaft with respect to said rear housing, a source of fluid pressure, and fluid circulating means including said source and a fluid ejector in one of said housings for directing a fluid stream through the aperture to maintain a predetermined fluid level within the other of said housings, said fluid ejector also being effective to provide a fluid back pressure for lubricating said bearing means.

3. In a transmission mechanism, the combination of a drive shaft, a driven shaft, a forward transmission unit driven by said drive shaft and enclosed within a forward transmission housing, a rear transmission unit driven by said forward transmission unit and adapted to drive said driven shaft and enclosed within a rear transmission housing, said housings being separated by a common partition having an aperture formed therethrough, a source of fluid pressure, and fluid circulating means including a fluid ejector or nozzle connected to said fluid source to be supplied with fluid therefrom and having a fluid outlet adjacent to and immediately directed toward the aperture formed in said partition whereby fluid supplied from said source to said ejector flows directly from said ejector and through said aperture so as to maintain a predetermined fluid level within said rear transmission housing.

4. In a transmission mechanism, the combination of a drive shaft, a driven shaft, a forward transmission unit driven by said drive shaft and enclosed within a forward transmission housing, a rear transmission unit driven by said forward transmission unit and adapted to drive said driven shaft and enclosed within a rear transmission housing, said housings being separated by a common partition having an aperture formed therethrough, a source of fluid pressure, fluid circulating means including a fluid ejector or nozzle connected to said fluid source to be supplied with fluid therefrom and having a fluid outlet separated from and directed toward the aperture formed in said partition whereby fluid supplied from said source to said ejector flows from said ejector and through said aperture so as to maintain a predetermined fluid level within said rear transmission housing, bearing means for rotatably mounting said driven shaft with respect to said rear transmission housing, and a fluid passage formed in said rear transmission housing opening into said fluid ejector and also opening into said bearing means whereby a portion of the fluid supplied to said fluid ejector is forced through said fluid passage for lubricating said bearing means.

5. In a transmission mechanism, the combination of a drive shaft; a driven shaft; a forward transmission unit enclosed within a forward transmission housing and adapted to be driven from said driven shaft; a rear transmission unit enclosed within a rear transmission housing and adapted to be driven by said forward transmission unit and to drive said driven shaft, said transmission housings being separated by a common partition having an aperture formed therethrough; fluid circulating means comprising a fluid reservoir formed in the bottom of said transmission housings, a fluid pump driven by said drive shaft, a fluid ejector comprising a longitudinal passage formed in said rear transmission housing and supplied with fluid from said pump and having an open end adjacent to and directing fluid toward and through said aperture of said partition so as to maintain a predetermined fluid level within said rear transmission housing, and a lubricating fluid passage formed in said rear transmission housing and opening into said fluid ejector passage; and bearing means for rotatably supporting said driven shaft with respect to said rear transmission housing, said bearing means comprising roller bearings and formed with a fluid access port in communication with said lubricating fluid passage whereby fluid back pressure from said ejector is effective to cause fluid to flow through said lubricating passage and said port into said bearings for lubricating them.

6. In a transmission mechanism, the combination of a drive shaft, a driven shaft, a forward transmission unit driven by said drive shaft and enclosed within a forward transmission housing, a rear transmission unit driven by said forward transmission unit and adapted to drive said driven shaft and enclosed within a rear transmission housing, said rear transmission unit and housing being disposed in an operating position at a lower elevation with respect to a horizontal plane than said forward transmission unit and housing, said housings being separated by a common partition having an aperture formed therethrough, a source of fluid pressure, and fluid circulating means including a fluid ejector or nozzle connected to said fluid source to be supplied with fluid therefrom and having a fluid outlet separated from and directed toward the aperture formed in said partition whereby fluid supplied from said source to said ejector flows from said ejector and through said aperture so as to maintain a predetermined fluid level within said rear transmission housing for thereby preventing the overheating of said rear transmission unit.

7. In a transmission mechanism, the combination of a drive shaft, a driven shaft, a forward transmission unit driven by said drive shaft and enclosed within a forward transmission housing, a rear transmission unit comprising planetary gearing driven by said forward transmission unit and adapted to drive said driven shaft and enclosed within a rear transmission housing, said housings being separated by a common partition having an aperture formed therethrough, a source of fluid pressure, fluid circulating means including a fluid ejector or nozzle connected to said fluid source to be supplied with fluid therefrom and having a fluid outlet separated from and directed toward the aperture formed in said partition whereby fluid supplied from said source to said ejector flows from said ejector and through said aperture so as to maintain a predetermined fluid level within said rear transmission housing, and a fluid passage formed in said rear transmission housing opening into said fluid ejector and adapted to transmit a portion of the fluid supplied to said fluid ejector to said planetary gearing for lubricating said gearing.

8. In a transmission mechanism, the combination of a drive shaft, a driven shaft, a forward transmission unit driven by said drive shaft and enclosed within a forward transmission housing, a rear transmission unit comprising planetary gearing driven by said forward transmission unit and adapted to drive said driven shaft and enclosed within a rear transmission housing, said housings being separated by a common partition having an aperture formed therethrough, a source of fluid pressure, fluid circulating means including a fluid ejector or nozzle connected to said fluid source to be supplied with fluid therefrom and having a fluid outlet separated from and directed toward the aperture formed in said partition whereby fluid supplied from said source to said ejector flows from said ejector and through said aperture so as to maintain a predetermined fluid level within said rear transmission housing, bearing means for rotatably mounting said driven shaft with respect to said transmission housing, and a fluid passage formed in said rear transmission housing opening into said fluid ejector and also opening into said bearing means whereby a portion of the fluid supplied to said fluid ejector is forced through said fluid passage for lubricating said bearing means and a portion of the fluid supplied to said bearing means is supplied to said planetary gearing for lubricating said gearing.

References Cited in the file of this patent

UNITED STATES PATENTS

| | | |
|---|---|---|
| 2,259,112 | Lundquist | Oct. 14, 1941 |
| 2,558,738 | Davis et al. | July 3, 1951 |
| 2,609,674 | Groat | Sept. 9, 1952 |
| 2,651,179 | Blood | Sept. 8, 1953 |
| 2,651,950 | Schou | Sept. 15, 1953 |
| 2,672,769 | Gerst | Mar. 23, 1954 |